United States Patent [19]
Okazaki

[11] Patent Number: 5,671,240
[45] Date of Patent: Sep. 23, 1997

[54] SOLID STATE LASER

[75] Inventor: Yoji Okazaki, Kanagawa-ken, Japan

[73] Assignee: Fuji Photo Film Co., Ltd., Kanagawa, Japan

[21] Appl. No.: 560,121

[22] Filed: Nov. 17, 1995

[30] Foreign Application Priority Data

Nov. 18, 1984 [JP] Japan ................... 6-285029

[51] Int. Cl.⁶ ........................................ H01S 3/11
[52] U.S. Cl. ..................... 372/19; 372/98; 372/22; 372/27
[58] Field of Search ................... 372/22, 98, 19, 372/92, 93, 102, 39; 359/328

[56] References Cited

U.S. PATENT DOCUMENTS

| | | |
|---|---|---|
| 5,233,620 | 8/1993 | Shinozaki et al. ............ 372/22 |
| 5,278,851 | 1/1994 | Goto ............................ 372/22 |
| 5,448,398 | 9/1995 | Asakura et al. ............... 359/328 |
| 5,452,312 | 9/1995 | Yamamoto et al. ............ 372/22 |
| 5,499,261 | 3/1996 | Welch et al. .................. 372/93 |

FOREIGN PATENT DOCUMENTS 62-189783  8/1987  Japan .................. H01S 3/109

OTHER PUBLICATIONS

20 Jun. 1991/vol. 30, No. 18/Applied Optics.

*Primary Examiner*—Leon Scott, Jr.
*Attorney, Agent, or Firm*—Sughrue, Mion, Zinn, Macpeak & Seas

[57]  ABSTRACT

In a solid state laser, a solid state laser medium is pumped with a pumping source. A wavelength selector element is disposed in a laser resonator and a twisting element makes a mode of an oscillating beam a twisted mode in the laser resonator.

6 Claims, 3 Drawing Sheets

SOLID STATE LASER

BACKGROUND OF THE INVENTION

1. Field of the Invention

This invention relates to a solid state laser, and more particularly to a solid state laser in which an etalon or the like is disposed in a resonator to make the oscillation mode a longitudinal singlemode.

2. Description of the Related Art

As disclosed, for instance, in Japanese Unexamined Patent Publication No.62(1987)-189783, there has been known a solid state laser in which a solid state laser rod doped with a rare-earth element such as neodymium is pumped with a semiconductor laser (laser diode).

In this kind of solid state laser, an etalon is sometimes provided in the resonator for wavelength selection in order to prevent mode competition noise and make the oscillation mode a longitudinal singlemode as described, for instance, in "Applied Optics", Vol. 30 (1991), P. 2495. Further it has been proposed to dispose a pair of quarter-wave plates in a resonator of a solid state laser to make the oscillation mode of the output beam a twisted mode (elliptical polarization state), for instance, in "Optics Letters", Vol. 18 (1993), P. 420, thereby making the oscillation mode a longitudinal single mode.

However our experiments have revealed that in either of the laser structures described above, increase in the output power of the laser is limited. That is, in the former structure, where an etalon is employed, when the output power of the solid state laser is increased, adjacent resonator modes are generated and it becomes difficult to make the oscillation mode a longitudinal singlemode. FIG. 4 schematically shows this state, where the portion indicated at $\underline{a}$ is the primary longitudinal mode and the portions indicated at $\underline{b}$ are the adjacent resonator modes.

In the latter structure, where the oscillation mode of the output beam is made a twisted mode, another resonator mode is generated at a distance of several to several tens of longitudinal modes from the primary longitudinal mode though no adjacent resonator mode is generated. Also in this case, it becomes difficult to make the oscillation mode a longitudinal singlemode. FIG. 5 schematically shows this state, where the portion indicated at $\underline{a}$ is the primary longitudinal mode and the portion indicated at $\underline{c}$ is said another resonator mode.

SUMMARY OF THE INVENTION

In view of the foregoing observations and description, the primary object of the present invention is to provide a solid state laser which is a longitudinal singlemode in the oscillation mode and has a high output power.

A solid state laser in accordance with the present invention is of a type in which a solid state laser medium is pumped with a pumping source and is characterized by having a wavelength selector element such as an etalon disposed in a laser resonator and a twisting means which makes a mode of an oscillating beam a twisted mode in the laser resonator.

As the wavelength selector element, for instance, a plane parallel plate which is provided with a coating highly reflective to the oscillating wavelength of the solid state laser at its one end face and with an ATF (absorbed thin film) having absorption to the oscillating wavelength of the solid state laser at its the other end face may be employed as well as an etalon in the form of a general plane parallel plate. As the twisting means, a pair of quarter-wave plates described above may be suitably employed.

Preferably a wavelength selector element whose FSR (free spectral range) or mode interval is substantially equal to the full width at half maximum of the gain of the solid state laser is employed.

As described above, disposing a wavelength selector element such as an etalon in the laser resonator has been known per se and providing a twisting means which makes a mode of an oscillating beam a twisted mode has been known per se. However since the wavelength selector element and the twisting means are provided for the same purpose, they have never been applied to a solid state laser together.

However our investigation reveals that when the wavelength selector element and the twisting means are proved together in a solid state laser, generation of adjacent resonator mode is suppressed by formation of the twisted mode and at the same time, generation of said another resonator mode (at a distance of several to several tens of longitudinal modes from the primary longitudinal mode) is suppressed by existence of the wavelength selector element, whereby a solid state laser can be increased in output power without deteriorating its longitudinal singlemode.

Thus in accordance with the present invention, by making the oscillation mode a longitudinal singlemode, mode competition is prevented and a high output power solid state laser can be obtained.

When the FSR of the wavelength selector element, e.g., etalon, is substantially larger than the full width at half maximum of the gain of the solid state laser, yield of making wavelength selector elements matching the gain peak deteriorates and it becomes difficult to make etalons conforming the gain peak. On the contrary, when the FSR of the wavelength selector element is substantially smaller than the full width at half maximum of the gain of the solid state laser, a second etalon mode is generated at a distance of the FSR and the longitudinal mode is apt to be a multimode (See FIG. 6). When the FSR of the wavelength selector element is substantially equal to the full width at half maximum of the gain of the solid state laser, these difficulties can be avoided.

DESCRIPTION OF THE PREFERRED EMBODIMENT

Figure 1:
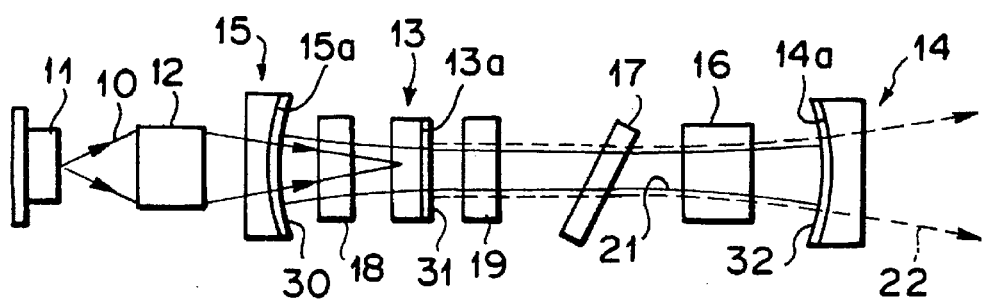
FIG. 1 is a schematic side view showing a solid state laser in accordance with a first embodiment of the present invention.

In FIG. 1, a laser-diode-pumped solid state laser in accordance with a first embodiment of the present invention comprises a semiconductor laser (phased array laser) 11 which emits a laser beam 10 as a pumping light beam, a focusing lens 12 such as of a rod lens which focuses the laser beam 10, which is a diverging light beam, a YAG crystal (a solid state laser medium) 13 doped with neodymium (Nd) (will be referred to as "Nd:YAG crystal", hereinbelow), a pair of resonator mirrors 14 and 15 which are respectively disposed in front (the right side as seen in FIG. 1) and rear of the Nd:YAG crystal 13, a $KNbO_3$ crystal 16 (nonlinear optical material) disposed between the Nd:YAG crystal 13 and the resonator mirror 14, an etalon (quartz plate) 17 disposed between the Nd:YAG crystal 13 and the $KNbO_3$ crystal 16, and a pair of quarter-wave plates (sapphire plates) 18 and 19 which are respectively disposed in front and rear of the Nd:YAG crystal 13 between the resonator mirrors 14 and 15. These components are integrally mounted in a housing (nit shown). The phased array laser 11 is kept at a predetermined temperature by a Peltier element and a temperature control circuit which are not shown.

The phased array laser 11 emits a laser beam 10 having a wavelength $\lambda 1$ of 809 nm. The Nd:YAG crystal 13 emits a laser beam 21 having a central wavelength $\lambda 2$ of 946 nm when neodymium inns are excited by the laser beam 10. The laser beam 21 enters the $KNbO_3$ crystal 16 and is converted to a second harmonic 22 having a wavelength $\lambda 3$ equal to $\lambda 2/2$ (=473 nm).

The reflecting surface 15a of the resonator mirror 15, the end face 13a of the Nd:YAG crystal 13 facing the $KNbO_3$ crystal 16 and the reflecting surface 14a of the resonator mirror 14 are respectively provided with coatings 30, 31 and 32 whose properties to wavelengths of $\lambda 1$ (=809 nm), $\lambda 2$ (=946 nm) and $\lambda 3$ (=473 nm) are as shown in the following table. In the following table, AR denotes antireflection (transmittivity of not lower than 99%) and HR denotes high reflectivity (reflectivity of not lower than 99%). The front and rear end faces of the quarter-wave plates 18 and 19 are antireflection-coated to the wavelength $\lambda 2$ (=946 nm), the front and rear end faces of the etalon 17 are uncoated.

|  | 809 nm | 946 nm | 473 nm |
| --- | --- | --- | --- |
| coating 30 | AR | HR | — |
| coating 31 | — | AR | HR |
| coating 32 | — | HR | AR |

By virtue of the coatings 30 and 32, the laser beam resonates between the reflecting surfaces 15a and 14a. Since the laser beam 21 enters the $KNbO_3$ crystal 16 in the resonating state, the laser beam 21 is effectively absorbed by the $KNbO_3$ crystal 16, whereby a second harmonic 22 is generated with a high efficiency. The second harmonic 22 is emitted through the resonator mirror 14 directly or after reflected in the reverse direction at the end face 13a of the Nd:YAG crystal 13 provided with the coating 31.

The etalon 17 is positioned at 30' to the direction of travel of the laser beam 21 and the FSR (free spectral range) is 0.8 nm which is substantially equal to the full width at half maximum of the gain of oscillation of the Nd:YAG crystal 13 in a 946 nm band. The resonance wavelength of the etalon 17 is 946.2 nm (under vacuum) and is equal to the gain peak wavelength of the Nd:YAG crystal 13. Deviation of the resonance wavelength of the etalon 17 from the gain peak wavelength of the Nd:YAG crystal 13 by about ±0.1 nm will involve practically no problem.

The quarter-wave plates 18 and 19 are positioned with their crystal axes at 90° with respect to each other. With this arrangement of the quarter-wave plates 18 and 19, the laser beam 21 is converted to a twisted mode between the quarter-wave plates 18 and 19. As a result, the laser beam 21 naturally oscillates at the gain peak wavelength, i.e., 946.2 nm. In this state, another resonator mode is generated at a distance of several to several tens of longitudinal modes from the primary longitudinal mode when the output power of the solid state laser is increased as described above. However in this embodiment, the etalon 17 suppresses generation of such another resonator mode.

Figure 2:
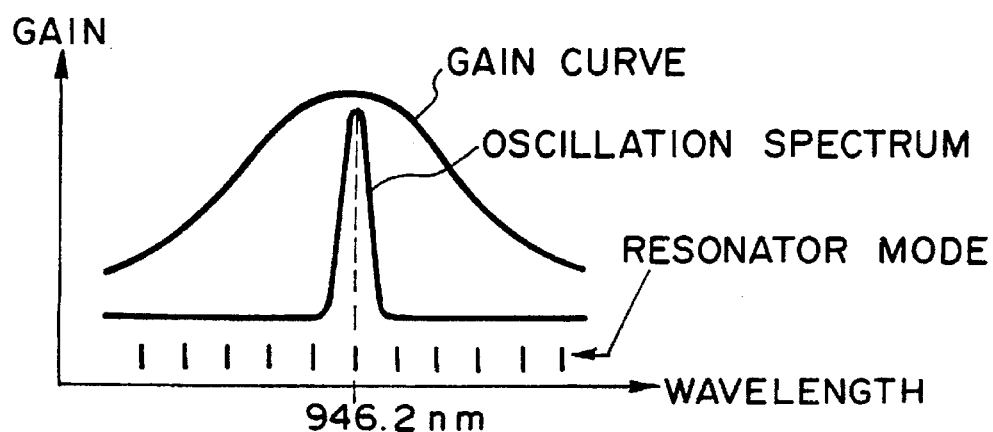
FIG. 2 is a view showing oscillation of the solid state laser of the first embodiment.

On the contrary, if oscillating wavelength selection is effected only by the etalon 17, adjacent resonator modes are generated when the output power of the solid state laser is increased. However in this embodiment, formation of the twisted mode suppresses generation of the adjacent resonator modes. Oscillation of this embodiment is shown in FIG. 2.

As can be understood from the description above, with the arrangement of this embodiment, increasing the output power of the solid state laser and making the output of the solid state laser a longitudinal singlemode can be realized together. In this embodiment, a second harmonic 22 of a longitudinal singlemode of 300 mW could be obtained with a pumping laser beam 21 of 3 W.

Figure 3:
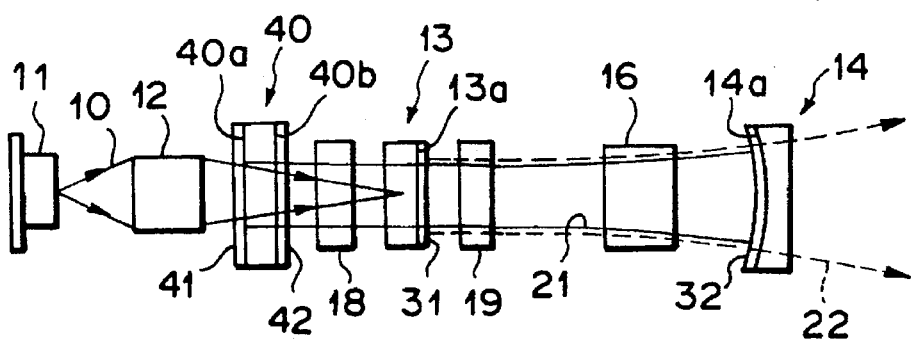
FIG. 3 is a schematic side view showing a solid state laser in accordance with a second embodiment of the present invention.
Figure 4:
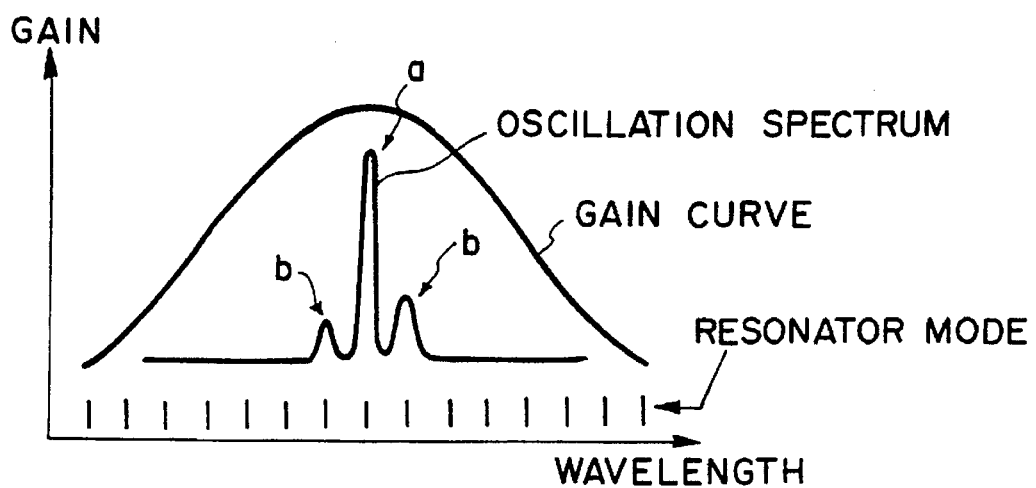
FIG. 4 is a view showing oscillation of the conventional solid state laser.
Figure 5:
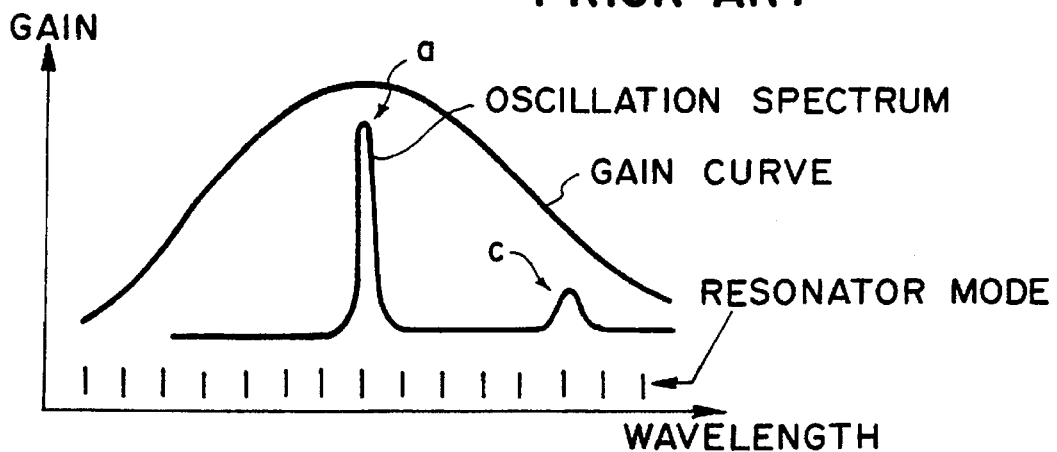
FIG. 5 is a view showing different oscillation of the conventional solid state laser.
Figure 6:
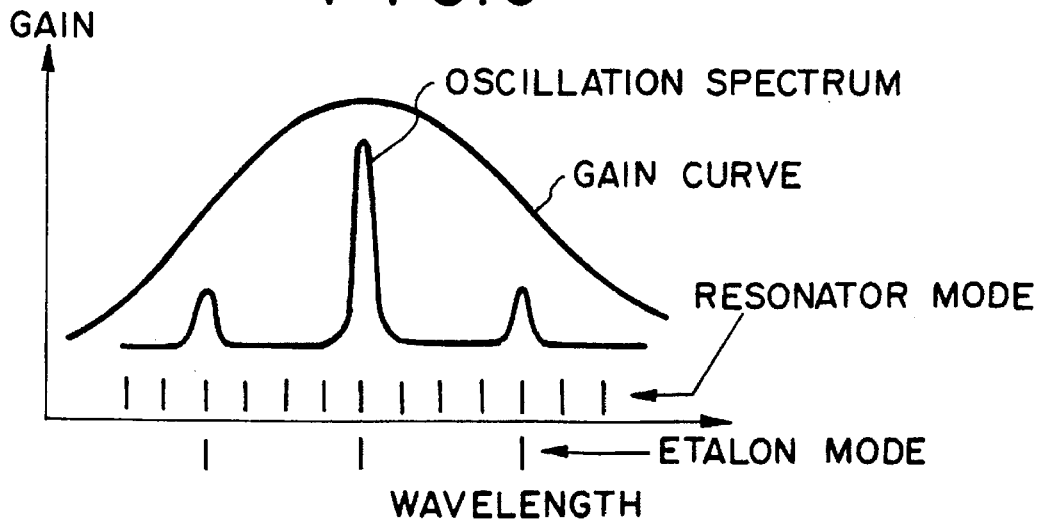
FIG. 6 is a view showing different oscillation of the solid state laser in accordance with the present invention.

A second embodiment of the present invention will be described with reference to FIG. 3, where the elements analogous to those in FIG. 1 are given the same reference numerals and will not be described here. The solid state laser of this embodiment is also a laser-diode-pumped solid state laser and differs from the solid state laser of the first embodiment in that a wavelength selector element 40 is employed with the etalon 17 and the resonator mirror 15 in the first embodiment omitted.

The wavelength selector element 40 comprises a plane parallel plate which is provided with a coating 41 at its rear end face 40a and with an ATF (absorbed thin film) 42 at its the other end face 40b. The coating 41 is of the same properties as the coating 30 applied to the resonator mirror 15 in the first embodiment. That is, the coating 41 exhibits antireflection (transmittivity of not lower than 99%) to the wavelength $\lambda 1$ (=809 nm) and exhibits high reflectivity (reflectivity of not lower than 99%) to the wavelength $\lambda 2$(946 nm). That is, in this embodiment, the resonator of the solid state laser is formed by the wavelength selector element 40 and the resonator mirror 14. The ATF 42 is of a 5 nm thick Cr film.

When the laser beam 21 enters the wavelength selector element 40, a standing wave can be generated with a node on the rear end face 40a of the wavelength selector element 40. In this case, only light of such a wavelength that a node can be generated also on the front end face 40b of the wavelength selector element 40. In this particular embodiment, out of a plurality of longitudinal modes having a central wavelength of 946 nm, only light of 946.2 nm can generate a standing wave and the other wavelengths which cannot generate a node on the front end face 40b are absorbed by the ATF 42 on the front end face 40b and suppressed from oscillating. Thus the wavelength selector element 40 acts in the same manner as the etalon 17 in the first embodiment, and accordingly also in the second embodiment, increasing the output power of the solid state laser and making the output of the solid state laser a longitudinal singlemode can be realized together.

Figure 7:
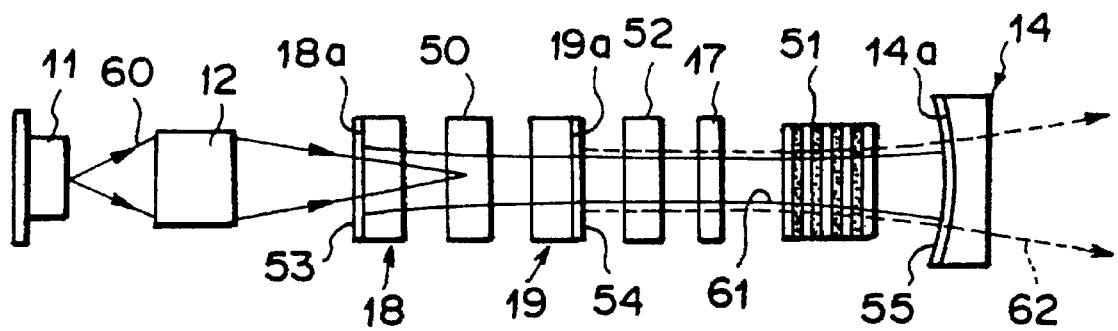
FIG. 7 is a schematic side view showing a solid state laser in accordance with a third embodiment of the present invention.

A third embodiment of the present invention will be described with reference to FIG. 7, hereinbelow. The solid state laser of this embodiment is also a laser-diode-pumped solid state laser and basically differs from the solid state laser of the first embodiment in that the resonator mirror 15 is omitted, the Nd:YAG crystal 13 is replaced by an Nd:YLF crystal 50, the KNbO$_3$ crystal 16 is replaced by a LiNbO$_3$ crystal 51 having a periodic domain inversion structure and a calcite plate 52 is disposed between the quarter-wave plate 19 and the etalon 17.

The semiconductor laser 11 emits a laser beam 60 having a wavelength $\lambda 1$ of 795 nm. The c-cut Nd:YLF crystal 50 emits a laser beam 61 having a central wavelength $\lambda 2$ of 1313 nm when neodymium inns are excited by the laser beam 60. The laser beam 61 enters the LiNbO$_3$ crystal 51 and is converted to a second harmonic 62 having a wavelength $\lambda 3$ equal to $\lambda 2/2$ (=657 nm).

The rear end face 18a of the quarter-wave plate 18, the front end face 19a of the quarter-wave plate 19 and the reflecting surface 14a of the resonator mirror 14 are respectively provided with coatings 53, 54 and 55 whose properties to wavelengths of $\lambda 1$ (=795 nm), $\lambda 2$ (=1313 nm) and $\lambda 3$ (=657 nm) are as shown in the following table. In the following table, AR denotes antireflection (transmittivity of not lower than 99%) and HR denotes high reflectivity (reflectivity of not lower than 99%).

|  | 795 nm | 1313 nm | 657 nm |
| --- | --- | --- | --- |
| coating 53 | AR | HR | — |
| coating 54 | — | AR | HR |
| coating 55 | — | HR | AR |

That is, in this embodiment, the resonator of the solid state laser is formed by the quarter-wave plate 18 and the resonator mirror 14. Since the laser beam 61 enters the LiNbO$_3$ crystal 51 in the resonating state, the laser beam 61 is effectively absorbed by the LiNbO$_3$ crystal 51, whereby a second harmonic 62 is generated with a high efficiency. The second harmonic 62 is emitted through the resonator mirror 14 directly or after reflected in the reverse direction at the end face 19a of the quarter-wave plate 19 provided with the coating 54..

The radius curvature of the reflecting surface 14a of the resonator mirror 14 is 30 mm, the length of the resonator of the solid state laser is 15 mm, the thickness of the calcite plate 52 is 1.5 mm and the length of the LiNbO$_3$ crystal 51 is 5 mm.

Also in this embodiment, by virtue of the quarter-wave plates 18 and 19, the laser beam 61 is converted to a twisted mode between the quarter-wave plates 18 and 19. As a result, the laser beam 61 naturally oscillates at the gain peak wavelength. It has been found that if there is no etalon, another resonator mode is generated at a distance of 0.4 nm, i.e., at a distance of 8 longitudinal modes when the output power of the solid state laser is increased. (This phenomenon does not occurs when the pumping power of the semiconductor laser 11 is low, e.g., 1 W) However in this embodiment, the etalon 17 suppresses generation of such another resonator mode.

On the contrary, if oscillating wavelength selection is effected only by the etalon 17, adjacent resonator modes are generated when the output power of the solid state laser is increased. However in this embodiment, formation of the twisted mode suppresses generation of the adjacent resonator modes.

The etalon 17 is 0.3 mm in thickness and the FSR (free spectral range) is 2 nm which is substantially equal to the full width at half maximum of the gain of oscillation of the Nd:YLF in a 1313 nm band. Accordingly a second etalon mode cannot be generated. Deviation of the resonance wavelength of the etalon 17 from the gain peak wavelength (1313 nm) of the Nd:YLF is within about ±0.1 nm. The reflectivity of the etalon 17 to a wavelength of 1313 nm is 20% and the etalon 17 is positioned at 5' to the direction of travel of the laser beam 61.

Further, since an anisotropic Nd:YLF crystal 50 is employed as the solid state laser medium in this embodiment, the laser beam 61 emanating from the quarter-wave plate 19 includes a pair of linear polarization components polarized in directions perpendicular to each other. Such a laser beam 61 enters the calcite plate 52 whose light passing end face is cut at an angle to the optical axis (so-called angle cut) and one of the linear polarization components is selected and caused to enter the LiNbO$_3$ crystal 51 so that the direction of the linear polarization is aligned with the Z-axis of the LiNbO$_3$ crystal 51.

With the arrangement described above, when the output power of the pumping laser beam 60 is 2 W, a second harmonic 62 of a longitudinal singlemode of 300 mW which is red in color can be obtained.

As the inclination of the etalon 17 increases, the wavelength selecting performance is improved. However since the etalon 17 has only to suppress said another resonator mode which can be generated relatively far from the gain peak wavelength and is inherently low in gain, the inclination of the etalon 17 need not be so large and may be as small as 5'. When the inclination of the etalon 17 is small, loss due to the etalon 17 can be reduced, and a high-power solid state laser is realized.

However when the output of the pumping laser 60 is increased to, for instance, 3 W or 10 W, it becomes difficult to suppress said another resonator mode and accordingly it is preferred that the inclination of the etalon 17 be increased to 10' or 30' to increase the wavelength selecting force.

Figure 8:
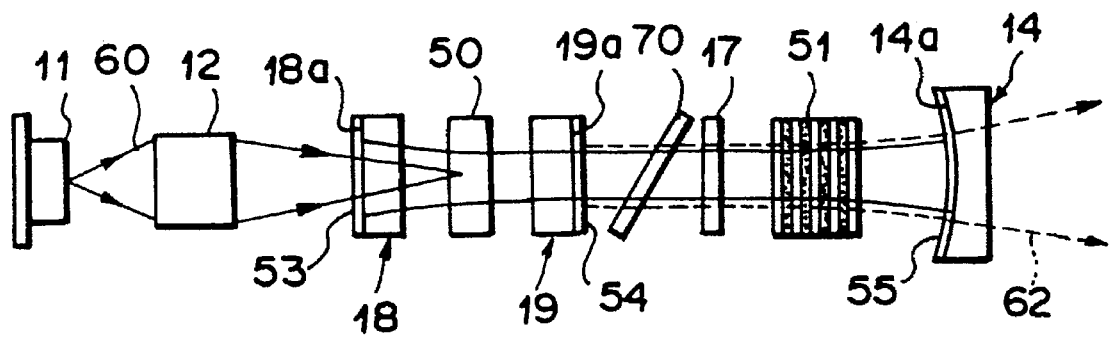
FIG. 8 is a schematic side view showing a solid state laser in accordance with a fourth embodiment of the present invention.

A fourth embodiment of the present invention will be described with reference to FIG. 8, hereinbelow. The solid state laser of this embodiment is also a laser-diode-pumped solid state laser and basically differs from the solid state laser of the third embodiment in that a Brewster plate 70 is employed as a polarization control element instead of the calcite plate 52.

When a Brewster plate 70 and a LiNbO$_3$ crystal 51 having a periodic domain inversion structure are combined together, the direction of the laser beam 61 (the fundamental wave) and the direction of the linear polarization of the second harmonic 62 conform with each other. AS is well known, the Brewster plate 70 causes little loss to a P-polarized light. Accordingly when the direction of the laser beam 61 and the direction of the linear polarization of the second harmonic 62 conform with each other, loss can be suppressed by causing the laser beam 61 and the second harmonic 62 to enter the Brewster plate 70 in P-polarized state. In such a case, the Brewster plate 70 need not be provided with a coating which is antireflective to the second harmonic 62.

The present invention can also be applied to various solid state lasers other than the laser-diode-pumped solid state lasers. Further the solid state laser medium, the pumping source, the nonlinear optical material for wavelength conversion and the like need not be limited to those employed in the embodiments described above.

What is claimed is:

1. A solid state laser in which a solid state laser medium is pumped with a pumping source to produce a laser beam, comprising:

a laser resonator which causes said laser beam to oscillate therein at an oscillation mode;

a twisting apparatus, disposed in said laser resonator, to produce a twisted mode of said oscillating laser beam such that generation of adjacent resonator modes of said oscillating laser beam are suppressed; and a wavelength selector element, disposed in said laser resonator, which selects a wavelength of said oscillating laser beam so as to suppress generation of another resonator mode of said oscillating laser beam;

the combination of said twisting apparatus and wavelength selector element thereby produce a substantially singlemode laser beam.

2. A solid state laser as defined in claim 1, wherein said wavelength selector element has a free spectral range which is substantially equal to the full width at half maximum of a gain curve representing a gain of oscillation of the solid state laser.

3. A solid state laser as defined in claim 2, wherein the oscillating laser beam in said twisted mode has linear polarization components, and in the laser resonator there are disposed:

a nonlinear optical crystal which has a periodic domain inversion structure and converts the wavelength of the oscillating laser beam to another wavelength, and a polarization control element which selectively permits that one of the linearly polarized components of the oscillating laser beam which is oriented in a predetermined direction relative to an optical axis of the nonlinear optical crystal to enter the nonlinear optical crystal.

4. A solid state laser as defined in claim 3, wherein said polarization control element is a Brewster plate.

5. A solid state laser as defined in claim 1, wherein the oscillating laser beam in said twisted mode has linear polarization components, and in the laser resonator there are disposed:

a nonlinear optical crystal which has a periodic domain inversion structure and converts the wavelength of the oscillating laser beam to another wavelength, and a polarization control element which selectively permits that one of the linearly polarized components of the oscillating laser beam which is oriented in a predetermined direction relative to an optical axis of the nonlinear optical crystal to enter the nonlinear optical crystal.

6. A solid state laser as defined in claim 5 wherein said polarization control element is a Brewster plate.

* * * * *